(12) United States Patent
Lary

(10) Patent No.: US 8,782,340 B2
(45) Date of Patent: Jul. 15, 2014

(54) HOT SHEET UPGRADE FACILITY

(75) Inventor: Richard Franklin Lary, Colorado Springs, CO (US)

(73) Assignee: Xiotech Corporation, Colorado Springs, CO (US)

( * ) Notice: Subject to any disclaimer, the term of this patent is extended or adjusted under 35 U.S.C. 154(b) by 161 days.

(21) Appl. No.: 13/312,764

(22) Filed: Dec. 6, 2011

(65) Prior Publication Data

US 2012/0166712 A1 Jun. 28, 2012

Related U.S. Application Data

(60) Provisional application No. 61/420,181, filed on Dec. 6, 2010.

(51) Int. Cl.
*G06F 12/00* (2006.01)

(52) U.S. Cl.
USPC .......................... 711/114; 711/103; 711/165

(58) Field of Classification Search
USPC ................... 711/103, 114, E12.002, E12.008
See application file for complete search history.

(56) References Cited

U.S. PATENT DOCUMENTS

| | | |
|---|---|---|
| 2006/0026229 A1 | 2/2006 | Ari et al. |
| 2008/0104343 A1 | 5/2008 | Miyagaki et al. |
| 2009/0282273 A1 | 11/2009 | Hamilton, II et al. |
| 2011/0035548 A1 | 2/2011 | Kimmel et al. |
| 2011/0191556 A1 | 8/2011 | Anderson et al. |
| 2011/0197046 A1 | 8/2011 | Chiu et al. |
| 2011/0246706 A1 | 10/2011 | Gomyo et al. |
| 2011/0252214 A1 | 10/2011 | Naganuma et al. |
| 2011/0271071 A1 | 11/2011 | Nakatogawa |
| 2012/0239859 A1* | 9/2012 | Lary et al. ..................... 711/103 |

OTHER PUBLICATIONS

PCT Search Report, mailed May 7, 2013.

* cited by examiner

*Primary Examiner* — Reginald Bragdon
*Assistant Examiner* — Mehdi Namazi
(74) *Attorney, Agent, or Firm* — Hall Estill Attorneys at Law

(57) ABSTRACT

Method and apparatus for managing data in a multi-device data storage array. In accordance with various embodiments, a storage array of independent data storage devices are arranged to form a fast pool and a slow pool of said devices. A controller is adapted to migrate a distributed data set stored across a first plurality of said devices in the slow pool to a second plurality of said devices in the fast pool. The migration is carried out responsive to a return on investment (ROI) determination by the controller that an estimated cost of said migration will be outweighed by an overall improved data transfer capacity of the storage array over a predetermined minimum payback period of time. In some embodiments, the fast pool is formed from a plurality of solid-state drives (SSDs) and the slow pool is formed from a plurality of hard disc drives (HDD).

20 Claims, 7 Drawing Sheets

| Time | History Pipeline Actions | | | | |
|---|---|---|---|---|---|
| Epoch 100 | Insert Epoch 100 W's & L's | then | Jettison W's from Epochs 96-100 that don't meet Equation (5) using I/O counts from Epoch 100 | then | Select up to K surviving W's for upgrade (and up to K L's for downgrade) from Epoch 96 |
| Epoch 101 | Insert Epoch 101 W's & L's | then | Jettison W's from Epochs 97-101 that don't meet Equation (5) using I/O counts from Epoch 101 | then | Select up to K surviving W's for upgrade (and up to K L's for downgrade) from Epoch 97 |
| Epoch 102 | Insert Epoch 102 W's & L's | then | Jettison W's from Epochs 98-102 that don't meet Equation (5) using I/O counts from Epoch 102 | then | Select up to K surviving W's for upgrade (and up to K L's for downgrade) from Epoch 98 |

FIG. 11

HOT SHEET UPGRADE FACILITY

RELATED APPLICATIONS

The present application makes a claim of domestic priority to U.S. Provisional Patent Application No. 61/420,181 filed Dec. 6, 2010.

BACKGROUND

Distributed data storage systems can be used to efficiently manage large volumes of data in a wide area network (WAN) or other network environment. Such systems may include an array of data storage devices that are arranged to form a mass storage memory space.

It is common to provide such systems with data migration capabilities. Data having a higher level of host interest may be relocated to a portion of the storage array capable of sustaining higher overall data transfer rates, while data in which the host is less interested may be moved to a location capable of sustaining lower overall data transfer rates. This allows the system to maintain a high IO (input/output) data rate while adapting to different user workloads.

With continued demands for ever increased levels of storage capacity and performance, there remains an ongoing need for improvements in the manner in which storage devices in such arrays are operationally managed. It is to these and other improvements that preferred embodiments of the present invention are generally directed.

SUMMARY

Various embodiments of the present invention are generally directed to an apparatus and method for adaptively arranging data in a multi-device data storage array containing a mix of fast and slow devices.

In accordance with various embodiments, a storage array of independent data storage devices is arranged to form a fast pool and a slow pool of said devices. A controller is adapted to migrate a data set stored across a first plurality of said devices in the slow pool to a second plurality of said devices in the fast pool.

The migration is carried out responsive to a return on investment (ROI) determination by the controller that an estimated cost of said migration will be outweighed by an overall improved data transfer capacity of the storage array over a predetermined minimum payback period of time.

In some embodiments, the fast pool is formed from a plurality of solid-state drives (SSDs) and the slow pool is formed from a plurality of hard disc drives (HDD).

These and various other features and advantages which characterize the various embodiments presented herein will become apparent upon reading the following detailed description in view of the associated drawings.

BRIEF DESCRIPTION OF THE DRAWINGS

FIG. 11 is another time sequence illustrating the use of the history pipeline referenced in FIG. 10.

DETAILED DESCRIPTION

Figure 1:
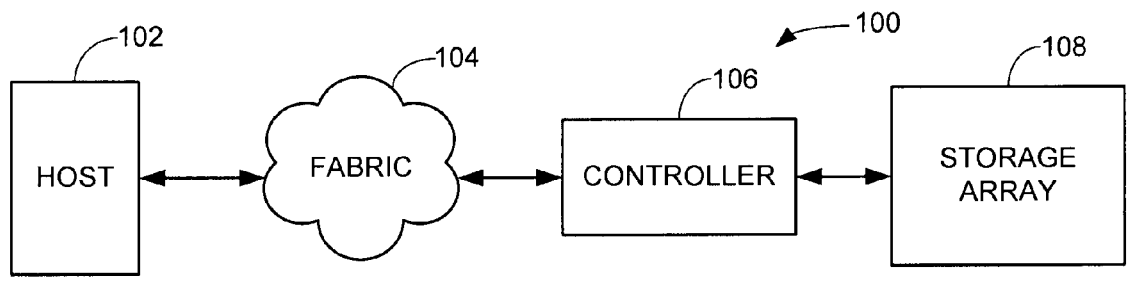
FIG. 1 generally illustrates a data processing system constructed and operated in accordance with preferred embodiments of the present invention.

FIG. 1 shows an exemplary data processing system 100. The system 100 is shown in FIG. 1 to include a host device 102, which may be a personal computer (PC) or other device utilized by a user of the system. The host device 102 communicates across a network fabric 104 with a controller 106, which interfaces with a data storage array 108 to store and retrieve user data.

It will be appreciated that the representation of the system 100 in FIG. 1 is highly simplified, as any number of additional features and components may be incorporated into the system as desired. Alternative configurations may include additional user host devices; multiple types and hierarchies of networks; the use of redundant controllers to facilitate fail over and fail back redundancy capabilities; multiple types and configurations of data storage arrays within the system, and so on.

The data storage array 108 is capable of storing data in a RAID (redundant array of independent discs) configuration. As will be recognized, RAID storage involves distributing a set of data across multiple independent data storage devices to enhance data integrity and system reliability. A number of RAID conventions are known in the art, such as but not limited to RAID-0 (which utilizes block level striping across multiple storage devices), RAID-1 (data mirroring), RAID-5 (data striping with distributed parity) and RAID-6 (data striping with double distributed parity).

Figure 2:
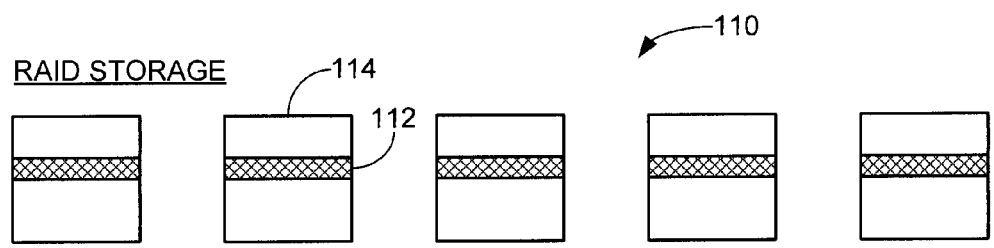
FIG. 2 is a functional representation of the use of so-called redundant array of inexpensive discs (RAID) storage in the storage array of FIG. 1.

FIG. 2 shows an exemplary RAID configuration in which a data set 110 is distributed across and stored as stripes of data 112 on various individual, independent data storage devices 114. Each stripe 112 stores a portion of the user data in the RAID set, as well as parity codes that allow the data set contents to be recovered in the event of failure of one or more data storage devices 114.

While not limiting, in some embodiments the data in the storage array 108 may be arranged using a grid system such as in accordance with the so-called RAID grid allocation system (RAGS). Generally, any particular collection of blocks of data belonging to the same distributed data set, such as the data set 110 in FIG. 2, can be assigned to a particular location within the grid system as a "sheet" of data.

A "book" can be defined as a grouping of sheets and may be constructed from multiple contiguous sets of blocks from different devices 114. The sheet size may vary depending on the system configuration, including RAID type. For purposes of providing a concrete example, a sheet size on the order of 240 MB of combined data and parity may be typical.

Figure 3:
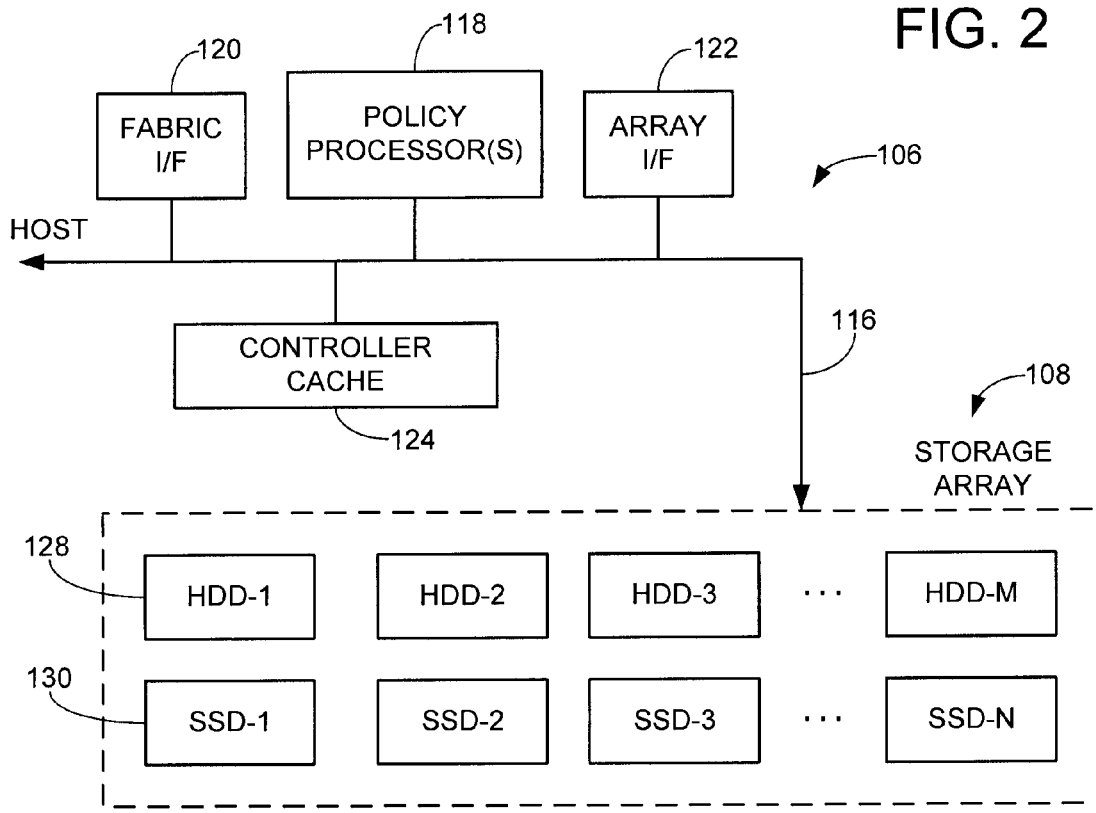
FIG. 3 provides a general block diagram of the controller and the storage array of FIG. 1 in accordance with some embodiments.

FIG. 3 is a functional block diagram of the controller 106 and the storage array 108 of FIG. 1 in accordance with some embodiments. It will be appreciated that the diagram of FIG. 3 is merely exemplary, as any number of different types and configurations of controllers and storage arrays can be utilized.

The controller 106 includes a main data pathway 116 to facilitate transfer of write data from the host device 102 to the storage array 108, and to facilitate the return of previously stored readback data from the storage array 108 to the host device 102. While the pathway 116 is shown as a single contiguous bus, it will be appreciated that this pathway, or data pipeline, can be formed from a number of separate internal and external pathways within the controller, including PCI busses and cross-point switches.

One or more policy processors 118, represented by a single functional block 118, provide various control functions for the controller 106. The processor(s) 118 may be realized as one or more programmable processors with associated programming in memory, or in hardware. A fabric interface (I/F) 120 handles communication functions with the fabric 104, and an array I/F 122 directs communications with the storage array 108.

A controller cache memory 124 represents a local volatile (e.g., DRAM) and/or non-volatile (e.g. Flash memory or battery-backed DRAM) memory space configured to temporarily store data utilized by the controller 106 during operation. The data stored in the cache 124 can include readback data retrieved from the storage array 108 for subsequent transfer to the host device 102, writeback data supplied by the host device for subsequent writing to the storage array 108, a metadata table indicative of the data structure of the array, programming used by the policy processors, temporary calculation values, and so on.

In a preferred embodiment, the storage array 108 of FIG. 3 includes a number M of hard disc drives (HDDs) 128 and a number N of solid-state drives (SSDs) 130. The HDDs 128 are denoted as HDD-1 to HDD-M, and the SSDs 130 are denoted as SSD-1 to SSD-N. The numbers M and N can take any respective values, although it is contemplated in many cases that M will be significantly greater than N.

Figure 4:
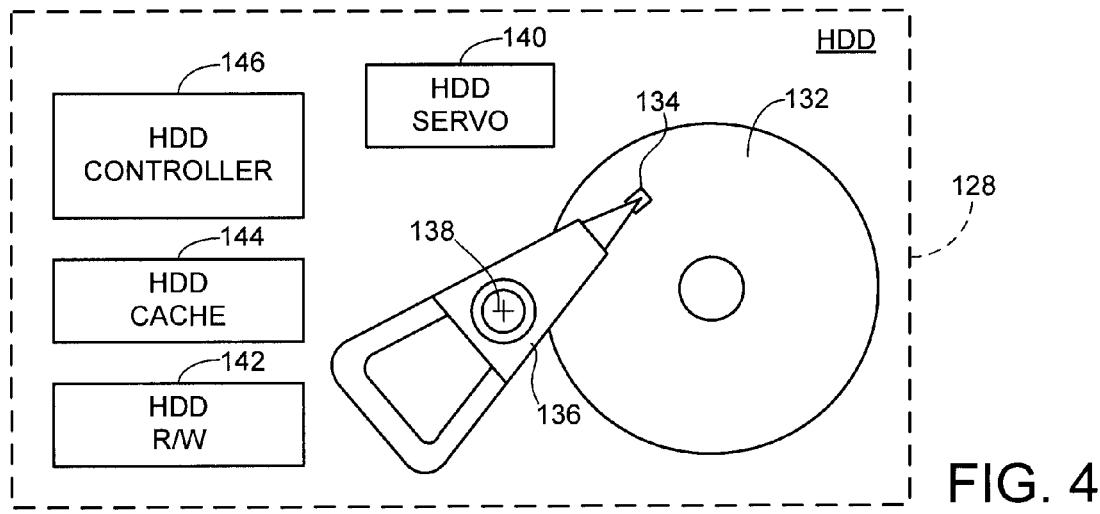
FIG. 4 provides a functional representation of a hard disc drive (HDD) of FIG. 3.

An exemplary HDD 128 is shown in FIG. 4. The HDD 128 includes one or more rotatable media 132 (e.g., magnetic discs) having recording surfaces that are accessed by a corresponding array of read/write data transducers 134. The transducers 134 are moved by a rotary actuator assembly 136. During operation, the actuator assembly 136 pivots about a pivot axis 138 responsive to inputs from a closed loop servo control system 140 to align a selected transducer 134 with a concentric track (not separately shown) on an associated media surface.

The HDD 128 further includes data read/write (R/W) channel electronics 142, a local cache memory 144 and an HDD controller 146. The R/W channel 142 conditions data for writing to the disc by the transducers 134, and reconstructs previously stored data from readback signals transduced by the transducers. The cache memory 144 temporarily stores data during transfer operations between the controller 106 and the media 132, and the HDD controller 146 provides top level communications and control for the drive 128. The total available data capacity of the HDD 128 may be on the order of around one terabyte, TB ($10^{12}$ bytes), although other capacities can be used.

Figure 5:
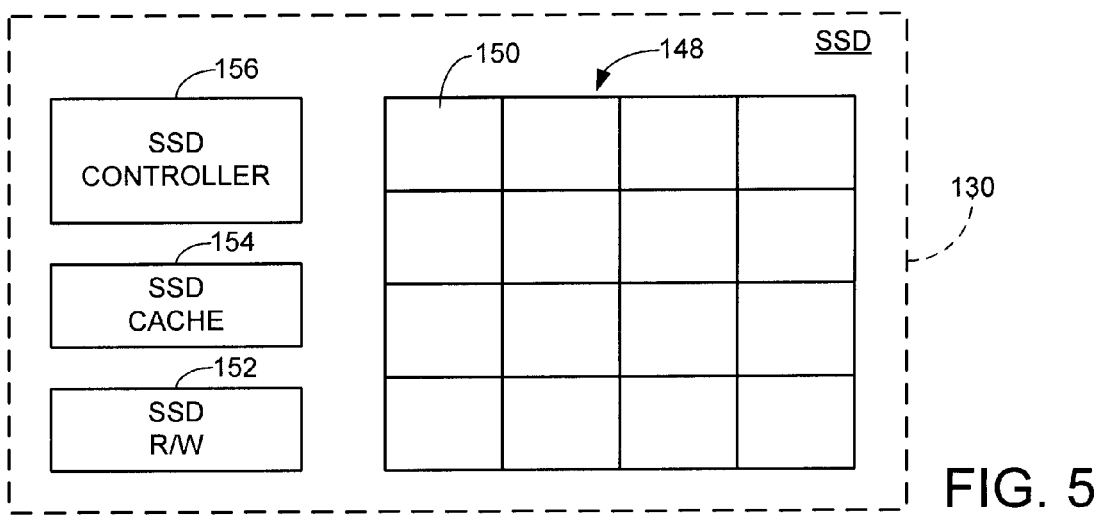
FIG. 5 represents a solid state drive (SSD) of FIG. 3.

FIG. 5 shows an exemplary SSD 130 from FIG. 3. The SSD 130 includes a non-volatile solid state memory array 148. The array 148 is contemplated as constituting an array of flash memory cells, although other forms of non-volatile memory can be used as desired. The array 148 is arranged as a series of erasure blocks 150, each constituting the smallest increment size of the memory array that may be subjected to an erasure operation at a given time. As will be recognized, flash memory cells require an erasure operation prior to being rewritten with new data. Each time an updated version of a data set is written to the array 148, the data will be written to a new location, such as a most recently allocated erasure block 150, and any older versions of the data set in the array will be marked for erasure (garbage collection).

The SSD 130 further includes R/W channel electronics 152, a cache memory 154 and an SSD controller 156. As with the HDD in FIG. 4, the SSD R/W channel 152 operates to direct the reading of data from the array 148 and the writing of data to the array. The SSD cache 154 temporarily stores data and other information, and the SSD controller 156 provides top level communication and control functions. The total available data capacity of the SSD 130 may be on the order of around 0.5 TB, although other data capacities can be used.

As will be recognized by those having skill in the art, a variety of HDD and SSD configurations are presently commercially available in the marketplace for incorporation into data storage arrays. At present, HDDs tend to be generally less expensive than SSDs on a per unit cost basis (e.g., dollars per gigabyte of data storage capacity, or $/GB), potentially by an order of magnitude or more. On the other hand, SSDs enjoy a significant advantage over HDDs in terms of I/O performance (e.g., I/O operations per second, or IOPS), potentially on the order of 1-2 orders of magnitude or more.

The performance advantages of SSDs over HDDs arise for a number of reasons, including the fact that HDDs can be subject to significant seek and media rotation latencies during operation. In the HDD 128, accessing any particular set of data stored to the rotatable media 132 may require a seek time delay to move and settle the associated transducer 134 onto the appropriate track, as well as a rotational time delay while the device waits for the data to rotate around to the data transducer. By contrast, all of the data stored in the SSD 130 can be accessed at substantially the same IO rate, irrespective of where the data are stored within the solid-state memory array 148.

Figure 6:
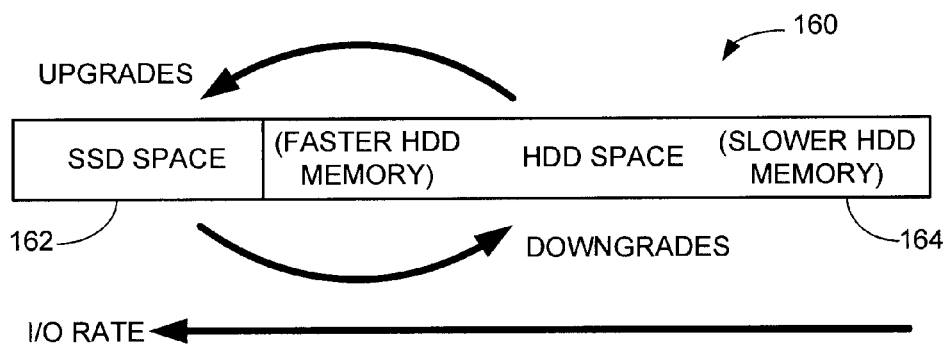
FIG. 6 depicts the overall memory space of the storage array and the management of data therein in accordance with various embodiments.

The mass storage array 108 of FIG. 3 incorporates both SSDs 130 and HDDs 128 in order to take advantage of the benefits offered by each type of device. The combined data storage capacity of the HDDs and the SSDs forms an overall memory space 160 for the system 100, as represented in FIG. 6. Data sets (sheets) may be stored in either the HDDs 128 or the SSDs 130, and if managed correctly in accordance with the present discussion, where the data are actually stored may be largely transparent to the system user.

It is apparent that the memory space 160 has an overall storage capacity in relation to the individual data capacities of the HDDs 128 and the SSDs 130, as well as the total numbers M and N of these respective units. An exemplary overall data storage capacity of the array memory space may be on the order of several hundred TB or more. The HDDs and SSDs may be physically grouped into smaller blocks of devices (e.g., "storage bricks" of 20 devices each) that are then accumulated in sufficient quantities to form the overall desired capacity of the memory space 160.

The memory space 160 includes an SSD memory space 162, which is the combined available memory of all of the N SSDs, and an HDD memory space 164, which is the combined available memory of all of the M HDDs. The SSD memory space 162 is referred to herein as fast (F) memory or a fast pool, and the HDD memory space 164 is referred to as slow (S) memory or a slow pool.

While the SSD space 162 will generally have a substantially uniform SSD data transfer rate irrespective of where the data sets are stored in the respective memory arrays 148 (see FIG. 5), such is not necessarily true for the HDD storage space 164. Rather, it is contemplated that the HDDs will employ constant angular velocity (CAV) and zone based recording (ZBR) techniques, so that data stored near the outermost diameters (ODs) of the rotatable media 132 will have a sustainable data transfer rate that is several times higher (e.g., 2×) the data transfer rate for data stored near the innermost diameters (IDs) of the media 132.

As explained below, various embodiments of the present invention configure the system 100 in such a way that, responsive to operational demands by the user, higher host interest data are migrated from the HDD memory space 164 to the faster IO SSD memory space 162, and lower host interest data are migrated from the SSD memory space 162 to the HDD memory space 164. As used herein, migration of data from HDD to SSD storage is referred to as an "upgrade," and migration of data from SSD to HDD storage is referred to as a "downgrade."

The upgrades and downgrades are carried out in such a manner as to reduce the incidence of thrashing, or repetitive internal movements of the data without apparent benefit to the overall system transfer rates. The upgrades and downgrades are further carried out in such a way as to increase the likelihood that the data maintained in the faster SSD memory space 162 will remain data of high interest to the host, and lower interest data will be moved out of the SSD memory space 162 to the slower HDD memory space 164.

In making these migration decisions, a determination is made that an estimated cost of a particular migration will be outweighed by an overall improved data transfer capacity of the storage array over a predetermined minimum payback period of time.

The upgrades and downgrades are carried out using a mechanism referred to herein as a hot sheet upgrade (HSU) utility. The HSU utility employs a return-on-investment (ROI) scheme that evaluates the benefits of various proposed data migrations in terms of the costs associated with the migrations. The HSU utility is preferably incorporated into the functionality of the controller 106, although such is not necessarily limiting.

The migrations carried out by the HSU facility are to different locations within the storage array 108. This is in contrast to the movement of data from the storage array 108 to the DRAM cache 126 of the controller 106. It will be apparent that the migration of data to the cache 126 can be viewed as being essentially "free," in the sense that any data moved to the cache 126, whether as a result of a host write request or a read from the storage array, requires relatively little cost to retain in the cache in terms of additional system bandwidth and other resources.

No further IO operations are required to retain read data in the cache 126 after the data have been transferred to the host. The IO operations for speculative data reads to transfer non-requested data (e.g. "read-ahead" data) to the cache 126 can be scheduled so as to not significantly impact the overall processor (CPU) loading, since the speculative data may have spatial locality to data that has been requested by the host. Thus, continuing to retain cached readback data in the controller cache 126 adds substantially no additional cost to the system, apart from the opportunity lost for cache hits on other data that could have been retained in the cache.

It will further be apparent that any cached read data in the cache 126 constitutes a secondary copy of the data, since a primary copy of the data remains in the array location from which the data were pulled. The cached data can thus be easily jettisoned from the cache by a simple overwrite operation with new data without the need to move the data to a safe location. There is therefore essentially no cost associated with removing cached read data from the cache.

By contrast, the movement of data within the array 108 between the SSD memory space 162 and the HDD memory space 164 can entail significant costs in terms of system resources. The movement of such data is carried out over the same control and data paths used to control the array 108. The use of these control and data paths to carry out a migration may interfere with the ability to satisfy on-going user initiated data accesses, and can consume significant CPU cycles and memory bandwidth. Such migrations will generally employ the movement of relatively large chunks of data, since keeping track of the locations of smaller chunks of data would tend to increase the complexity and size of the metadata tables maintained by the controller.

It follows that migrating data between the HDD space 164 and the SSD space 162 can incur significant costs in terms of CPU cycles, memory bandwidth, back-end bandwidth and HDD bandwidth, over and above the cost of the user access that stimulated the movement to begin with. The HSU facility of the present disclosure operates to evaluate whether sufficient benefit, in terms of improved system data transfer capacity over a selected payoff period, is likely to be gained before initiating any such migrations. If insufficient benefit can be reasonably foreseen, then no migrations will be performed and the system will be left as it is, along with the knowledge that the current allocations between the SSD and HDD space are sufficiently optimized.

Figure 7:
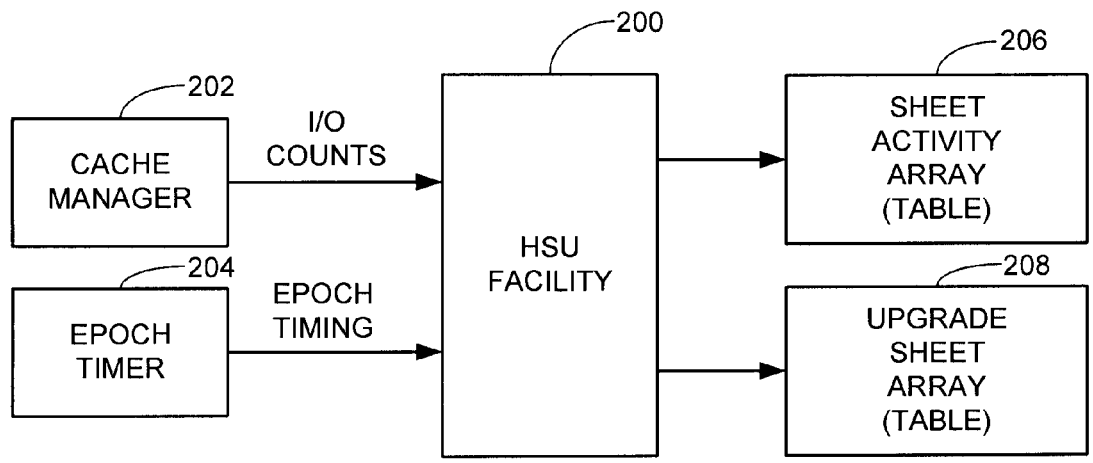
FIG. 7 is a functional block diagram of portions of the controller of FIG. 3 operated in accordance with some embodiments to carry out the upgrade and downgrade migrations depicted in FIG. 6.

FIG. 7 is a block diagram representation of relevant portions of the controller 106. The various blocks in FIG. 7 may be realized in software, firmware, hardware or some combination thereof, and may form a part of the policy processor functionality.

The aforementioned HSU (hot sheet upgrade) facility is represented by block 200 in FIG. 7. The HSU facility 200 operates to make migration decisions for various sheets in the array 108. The HSU facility 200 may be responsible for all of the sheets in the array, or for a subset of sheets, as required. In the latter case, only portions of the fast and slow pools may be made available to the HSU facility for sheet migrations.

As used herein, the term "sheet" will be broadly understood as a data set (e.g., a RAID set), orders of magnitude smaller in capacity than an HDD, that is stored across multiple independent storage devices such as the HDDs 128 or the SSDs 130, as opposed to a data set that is wholly contained within a single data storage device. This distinction will be appreciated because an individual device such as the HDDs 128 and SSDs 130 may have its own internal capabilities of rearranging data to appropriate locations within itself, such as to different disc 132 surfaces/radii or different erasure blocks 150. These internal rearrangements are carried out without "going outside" the device to consume system level resources, and are therefore carried out in a manner that is transparent to other system components such as the controller 106. The actual resolution size of the set can be any suitable size, with the understanding that smaller sizes will generally entail greater data collection and tracking requirements as compared to relatively larger sizes.

The HSU facility 200 operates in response to inputs supplied by a cache manager block 202 and an epoch timer 204. The HSU facility 200 generates a series of data structures that are used to govern the ROI evaluation and migration process. These data structures may include a sheet activity array (table) 206 and an upgrade sheet array (table) 208. The cache manager 202 supplies data to the HSU facility 200 in the form of user-initiated IO counts, and the epoch timer 204 supplies epoch timing indication signals to the HSU facility 200 at regular intervals.

As used herein, an "epoch" refers to an elapsed time interval during which the HSU facility 200 collects data that indicates how much user-initiated back-end IO is occurring to every sheet in the system. At the conclusion of each epoch, the HSU facility 200 processes the data it has received and, based on that data and data from previous epochs, makes a migration decision. The system then commences a new epoch, during which the foregoing operations are repeated.

Epochs occur sequentially and each epoch has a common duration. This duration may be settable by the user or a system administrator. An exemplary epoch interval duration may be 20 seconds for each epoch, although any suitable duration can be used. In some embodiments, epoch durations range from as low as around three (3) seconds to as high as five (5) minutes or more. Lower or higher values can be used. It has been found that on some cases that epochs shorter than about 3 seconds in length may lead to significant quantization errors, and epochs longer than about 5 minutes may reduce the rate of adaptation to real changes in I/O patterns.

By way of illustration, assume the array 108 has a total of ten (10) 3.5 inch form factor, 7200 RPM magnetic disc drives, which combined can store on the order of about 33,000 sheets of combined data and parity (of 240 MB each) in the available data pool (e.g., HDD memory space 164 in FIG. 6). An exemplary IO rate for this group of devices may be on the order of about 1600 IOs per second (IOPS). Using a IO second epoch, the "average" sheet in the pool might experience something on the order of about 1600/33,000=0.05 IOPS, or about 0.5 IOs over the duration of the epoch.

A single small RAID-5 write may result in a total of four (4) IOs to a single sheet of data. These additional IOs may include the need to read the existing RAID set, recalculate various parity values, and rewrite the completed data set to the devices. Based on raw IO counts, this provides a rate that is eight times the average expected rate (e.g., 4 IOs v. 0.5 IOs). Thus, if the epoch interval is too short, a single user-initiated access to a single sheet might look like a spike in activity indicative of high host interest in the data, whereas in reality only one actual access of the data was requested by the host.

The use of relatively longer epochs, combined with the use of other IO filtering techniques to be discussed below, can filter out the "noise" associated with individual IOs so that a sustainable access pattern can be gleaned from the access statistics. Epochs as disclosed herein also present an effective way to clear out the accumulated IO counts in situations where upwards of tens of thousands of sheets (or more) of data are being tracked at the same time.

It is contemplated that the epochs will be individually identified using a sequentially increasing count, referred to as the epoch number (e.g., epoch 1, epoch 2, epoch 3, . . . ). The data structures 206, 208 maintained by the HSU facility 200 accumulate the sheet IO counts on a per sheet basis, and also identify the associated epoch number in which those counts were obtained. If the epoch number in a particular entry for a particular sheet does not match the current epoch, the sheet's IO count for the current epoch can be deemed to be zero (0) IOs, and the next IO to that sheet can operate to update the sheet's epoch number and clear its count before updating the count with the current IO.

Tracking the epoch numbers also allows a differentiation to be made between different "degrees of zero" for the existing 10 count. For example, a mismatched epoch number in an entry at the end of an epoch means that there have been "zero IOs for the last E epochs," where E represents the size of the mismatch in terms of elapsed epochs. This data may be useful in selecting which data set to downgrade.

Depending on the data structure configuration, it is contemplated that the continuously incrementing epoch numbers can eventually "wrap around" (return to zero) in value. The effects of such wrap-arounds are benign. In a worst case scenario, a sheet that hasn't received an IO for a long time might theoretically be selected as a possible upgrade candidate due to an epoch number wrap-around, but will not be actually upgraded because of other filters in the HSU facility operation, such as the use of a history pipeline discussed below.

For reference, the use of a 16-bit epoch number combined with a 10 second epoch duration would result in the epoch numbers being wrapped around (returning to an initial 0 count) once per week. The use of a 24-bit epoch number with a 10 second epoch duration would not result in a wrap-around return to zero until about five (5) years have passed. An appropriate size for the maximum epoch number can be tailored to meet system requirements.

The HSU facility 200 is generally configured to offload highest-interest random back-end IO operations from the HDD memory space 164 to the SSD memory space 162, and vice versa. In at least some embodiments, the focus is primarily on the migration of data subject to random accesses rather than sequential accesses.

Random accesses are user-initiated accesses for sheets with nonsequential logical and/or physical proximity, and are carried out to different, non-adjacent locations in the array (e.g., non-related files used by different applications or processes). Sequential accesses involve the sequential transfer of data that are in logical and/or physical proximity, such as the streaming of a large data set (e.g., a large database or a movie, etc.).

HDDs 128 are particularly suited to transferring sequential data in a fast and efficient manner, due to the relative rarity of seek operations. The ratio of SSD to HDD transfer rates for sequential IO data may be about 3:1, so storing sequentially accessed data in the SSDs only provides a marginally higher data transfer rate for the overall system. On the other hand, the ratio of SSD to HDD transfer rates for random IO data may be about 25:1 to 100:1 or more. Thus, it makes sense to migrate random IO data to the SSDs and to leave sequentially accessed data in the HDDs.

Another advantage to ignoring sequentially accessed data for purposes of migration to the SSDs is that sequential IOs might tend to dominate the overall IO counts since the requests can tend to hit the same sheet rapidly in succession, and thereafter not hit it again. This might cause the HSU facility 200 to make exactly the wrong decisions in terms of which sheet(s) to migrate to SSD, always moving the data "one-step-behind" where it should be.

A variety of techniques can be used to filter out sequential IO operations from consideration by the HSU facility 200. In some embodiments, the cache manager 202 is able to detect sequential IO requests, and does not forward these counts to the HSU facility 200. Because the cache manager 202 can be configured to operate as the primary requestor of data from the array 108, the cache manager can easily detect when the observed order of requests for the virtual block addresses (or other nomenclature for the requested data) indicates a sequential data transfer.

In other embodiments, all of the raw IO counts for user-initiated accesses can be supplied by the cache manager 202 to the HSU facility 200, and the HSU facility can operate to detect and jettison counts related to sequential accesses. It is noted that in either scheme, the IO counts from the cache manager are preferably limited to those specifically relating to user-initiated accesses, which means that other background IOs such as used during RAID rebuilds, data scrubbing, background and demand zeroing, and internal data reconfiguration, are ignored and are not included in the accumulated statistics. These counts are usually one-time operations and are not directly indicative of host interest. However, it is possible to include these counts in the accumulated statistics if desired.

In some embodiments, the cache manager 202 may issue its back-end IOs as virtual operations, which may be turned into multiple operations based on IO type and RAID configuration. As noted above, a single write access of a RAID-5 sheet may result in a total of 4 IOs, which increases the total amount of processing time and effort that has to be carried out by the respective storage devices in order to store the data. If cache manager back-end I/Os are virtual, each IO count received by the HSU facility 200 can be weighted by the HSU facility in terms of the total overhead processing effort required to satisfy the request.

For example, all reads of data, no matter what the RAID configuration thereof, can be assigned a weight of 1.0. A write operation of RAID-0 data may be assigned a weight of 1.0. A RAID-1 write operation may be given a weight of 2.0. A small RAID-5 write may have an assigned weight of 3.5. As desired, the size (e.g., block or sector count) of a particular IO operation may be taken into account in determining an overall weighted 10 count. Generally, the size of a given data transfer has little effect on overall latency for both SSDs and HDDs, although this effect can become increasingly pronounced as the data I/O size increases. A weighting compensation factor based on transfer size can be selected, such as a value of about 0.2% per 1 KB transferred after the first 4 KB. So for example, a RAID-5 write with 64 KB of data might be given an assigned weight of 3.5*1.12=3.9.

Figure 8:
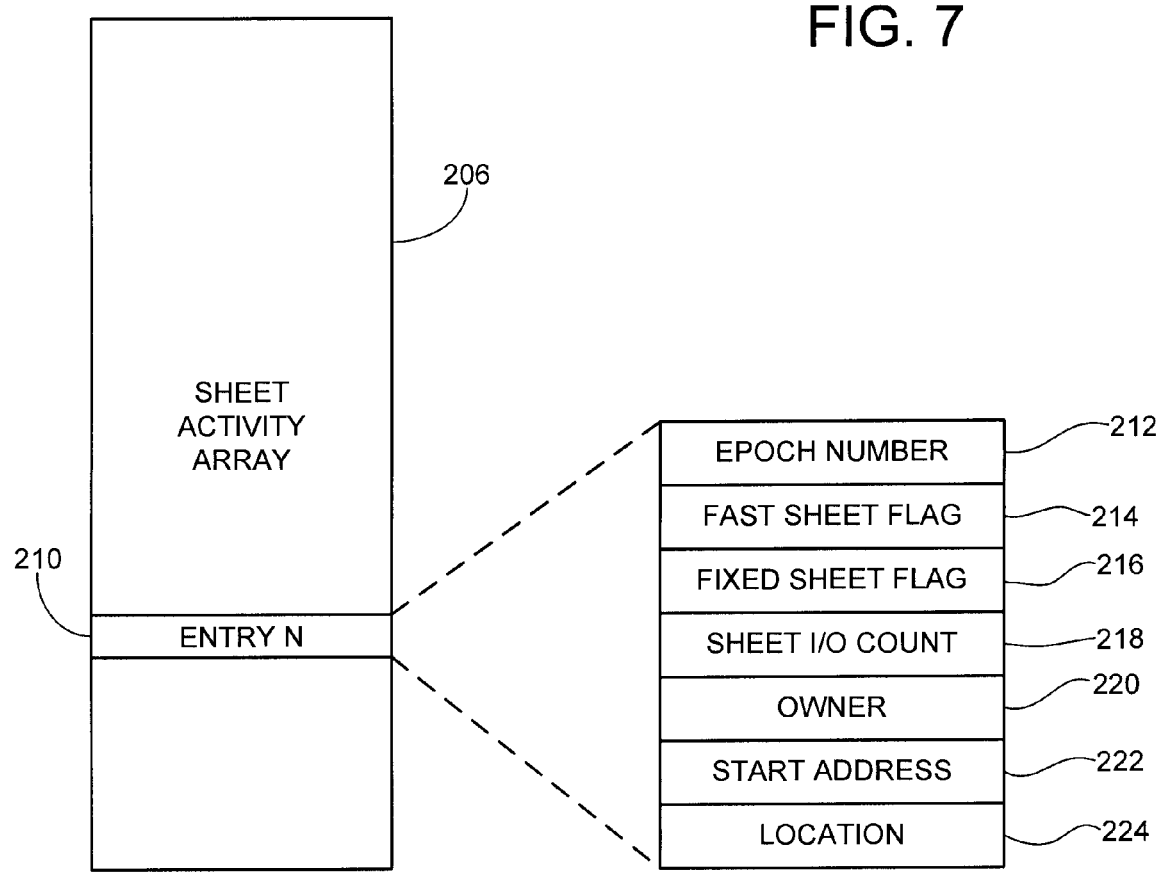
FIG. 8 shows an exemplary format for a sheet activity array (table) generated and maintained by the hot sheet upgrade (HSU) facility of FIG. 7.

During system initialization, the HSU facility 200 in FIG. 7 scans the existing array data structure and constructs the sheet activity array 206 and the upgrade sheet array 208. The sheet activity array 206 serves to track sheet 10 activity and ownership, and may take a format as shown in FIG. 8. In FIG. 8, each sheet has an associated entry 210, such as Entry N for sheet N. Each entry 210 includes a number of fields including an epoch number field 212 which identifies the epoch number for the most recent epoch in which at least one user initiated, random 10 was carried out for that sheet. A fast sheet flag field 214 indicates whether the sheet is currently located in fast memory (e.g., in the SSD memory space 162). A fixed sheet flag field 216 indicates whether the sheet should remain in a fixed location and not be moved, such as a dedicated portion of the storage array.

A sheet 10 count field 218 provides a count of "weighted IOs" for the epoch identified in the epoch number field 212. An owner field 220 identifies the logical user device (if any) that owns the sheet. A start address field 222 indicates the beginning address (such as in terms of virtual block address, VBA) of the sheet. A location field 224 identifies the location of the sheet in the storage array.

The upgrade sheet array 208 is arranged as a number of entries, with one entry for each sheet in the fast portion of the storage array that has been made available for management by the HSU facility 200. If a sheet has not been allocated, the entry will be a NULL pointer. If the sheet has been allocated and upgraded, the entry in the table 208 can be used to point to the sheet's entry in the table 206.

The HSU facility 200 uses a return on investment (ROI) evaluation of the collected, weighted IO counts to determine whether to perform a migration. Different calculations can be used depending on whether the migration only involves an upgrade, or whether the migration involves both an upgrade and a downgrade.

An upgrade-only migration means that there is available, non-allocated space in the SSD memory space 162 that could accommodate the addition of a particular set of data, so that carrying out this upgrade would not result in the displacement of any existing data in the SSD memory space. An upgrade-downgrade migration means that the upgraded data set that is moved to the SSD memory space is going to require the displacement of an existing set of data from the SSD memory space to the HDD memory space.

The costs associated with each of these migration types will be discussed in turn. In some embodiments, the ROI evaluation of a potential upgrade-only migration can be carried out in accordance with the following relation:

$$IOsPerHour(S) > CostToUpgrade(S) * ROIhurdle \quad (1)$$

where (S) indicates that the sheet under consideration is currently located in slow (e.g., HDD) memory, IOsPerHour(S) is an extrapolation of an expected IO rate for the sheet over an hour elapsed time, CostToUpgrade(S) is a value indicative of the additional system resources necessary to upgrade the sheet of data to fast (e.g., SSD) memory, and ROIhurdle is a threshold (investment payoff) value. Thus, relation (1) generally evaluates whether the expected IO interest in the data, while it remains in the slow pool, is greater than the cost to upgrade the data to the fast pool.

The IOsPerHour(S) value from equation (1) may be extrapolated as follows:

$$IOsPerHour(S) = IOsInLastEpoch(S) * 3600 / DurationOfLastEpoch \quad (2)$$

where IOsInLastEpoch(S) is the weighted accumulated count of IOs for the associated sheet during the most recent epoch. The CostToUpgrade(S) value from equation (1) can be determined as follows:

$$CostToUpgrade(S) = (AmountOfUserData(S)/MigrationChunkSize) * RelativeMigrationIOCost \quad (3)$$

where AmountOfUserData(S) depends on the RAID organization of the sheet in consideration and whether parity data is read from the sheet or regenerated by the controller during the migration, and may be on the order of from about 120 MB-240 MB.

MigrationChunkSize is a suitable I/O chunk size for migrating data, such as 1 MB (megabyte or $10^6$ bytes). The RelativeMigrationIOCost is a value indicative of the ratio of the time a single HDD requires to read or write the MigrationChunkSize to the time it takes to perform a small (e.g. 4 KB) random read or write. The RelativeMigrationIOCost value can be a settable parameter, with a suitable value being 3.0. This value can be empirically determined in relation to the different operational characteristics of the fast and slow pools of memory.

The ROIhurdle value of relation (1) can be expressed in terms of a percentage. In this context, an ROIhurdle value of 1.0 (100%) means that a migration would be justified only if the cost of the migration is projected to be paid back within an hour. Other values would indicate other payback periods: for example, an ROIhurdle value of 0.1 (10%) would require payback within 10 hours, whereas an ROIhurdle value of 30.0 (3000%) would require a payback within the next two minutes. This value is settable by the user or system administrator, with 1.0 being the default value.

At the conclusion of a given epoch, the HSU facility 200 can evaluate a particular sheet having an associated IO count and determine whether it would be advantageous to migrate that sheet from HDD to an available location in SSD. It will be appreciated that the migration effort will require the use of significant system resources to read the data out from the HDD memory space 164 to the controller cache 126 (see FIG. 3) and then to write the data from the cache 126 to the SSD memory space 162. Because the system resources are tied up performing this operation, these resources are not available for use in satisfying on-going user-initiated requests. Hence, the initial transfer may result in a temporary decrease in the then-observable average system IO rate.

However, if a standard ROIhurdle value of 1.0 is used, it is expected that, over the next hour, the overall average system IO rate will actually be improved over what would have otherwise been observed had the migration not taken place. Longer and shorter payback periods can be readily implemented by changes in the ROIhurdle value. Alternatively, relation (1) can be used to calculate an actual payback period (PaybackPeriod) for a potential upgrade-only migration, as follows:

$$\text{PaybackPeriod} = \text{CostToUpgrade}(S)/\text{IOsPerHour}(S)/ \quad (4)$$

In this alternative case, the PaybackPeriod value could then be evaluated to determine whether it is sufficiently short to warrant the migration.

As noted above, an upgrade-downgrade migration involves the same steps as an upgrade-only migration, plus additional IOs to read out the displaced data from the SSD space and to write the displaced data to the HDD space.

The ROI determinations for upgrade-downgrade migrations can be carried out as follows:

$$(\text{IOsPerHour}(S) - \text{IOsPerHour}(F)) > (\text{CostToUpgrade}(S) + \text{CostToDowngrade}(F)) * \text{ROIhurdle} \quad (5)$$

where IOsPerHour(S), CostToUpgrade(S) and ROIhurdle are calculated as set forth above.

IOsPerHour(F) is extrapolated in a manner similar as in equation (2) above to evaluate how many expected IOs would be for the data being moved from the SSD fast (F) memory. CostToDowngrade(F) is a factor indicative of the additional costs associated with placement of the displaced data into the slower HDD memory, and may be determined similarly as set forth for equation (3) above.

One difference between the CostToUpgrade(S) value and the CostToDowngrade(F) value is that the CostToDowngrade(F) generally may not depend on the RAID organization of the data, since all sheet migrations may be configured to write a full 240 MB of combined data and parity to the target sheet, and the target sheet in a downgrade will be to the slow (S) pool of memory.

It will be appreciated that the foregoing relations are merely exemplary, and that other ways to evaluate the costs of migrations will readily occur to the skilled artisan in view of the present disclosure. Generally, one purpose in migrating data to the SSD memory space is to endeavor to reduce, as much as possible, the amount of latency time associated with the slower HDD memory space. That is, there is not only a benefit to moving higher host interest data to the SSD, but to the extent this is successful, the observed HDD latency may improve since the I/O rate to the slow pool will be reduced. Since the slow pool is usually the bottleneck, overall system performance will be improved.

The above relations are all first order approximations. More detailed models can take into account specific times or operations required by the SSDs and/or the HDDs. For example, the various ROI analyses can take into account whether downgraded data is to be stored at a relatively faster location on the rotatable media (e.g., near the ODs) or to be stored at a relatively slower location on the rotatable media (e.g., near the IDs). Similarly, the decision to upgrade from HDD to SDD can also evaluate whether the candidate data is near the OD or ID of the discs. If the fast devices are only somewhat faster than the slow devices (e.g. from 2× to 4× faster), the impact of references to the upgraded data, and the impact of the upgrade operation itself, on the fast devices should also be taken into account; this is not needed if for example, SSDs are used as the fast devices. Finally, data stored on HDD that is found to not warrant an upgrade to SSD might nevertheless warrant a relocation, based on the HSU utility findings, of the data to a faster location within the HDDs, such as an available location nearer the ODs in a different set of the HDDs.

Figure 9:
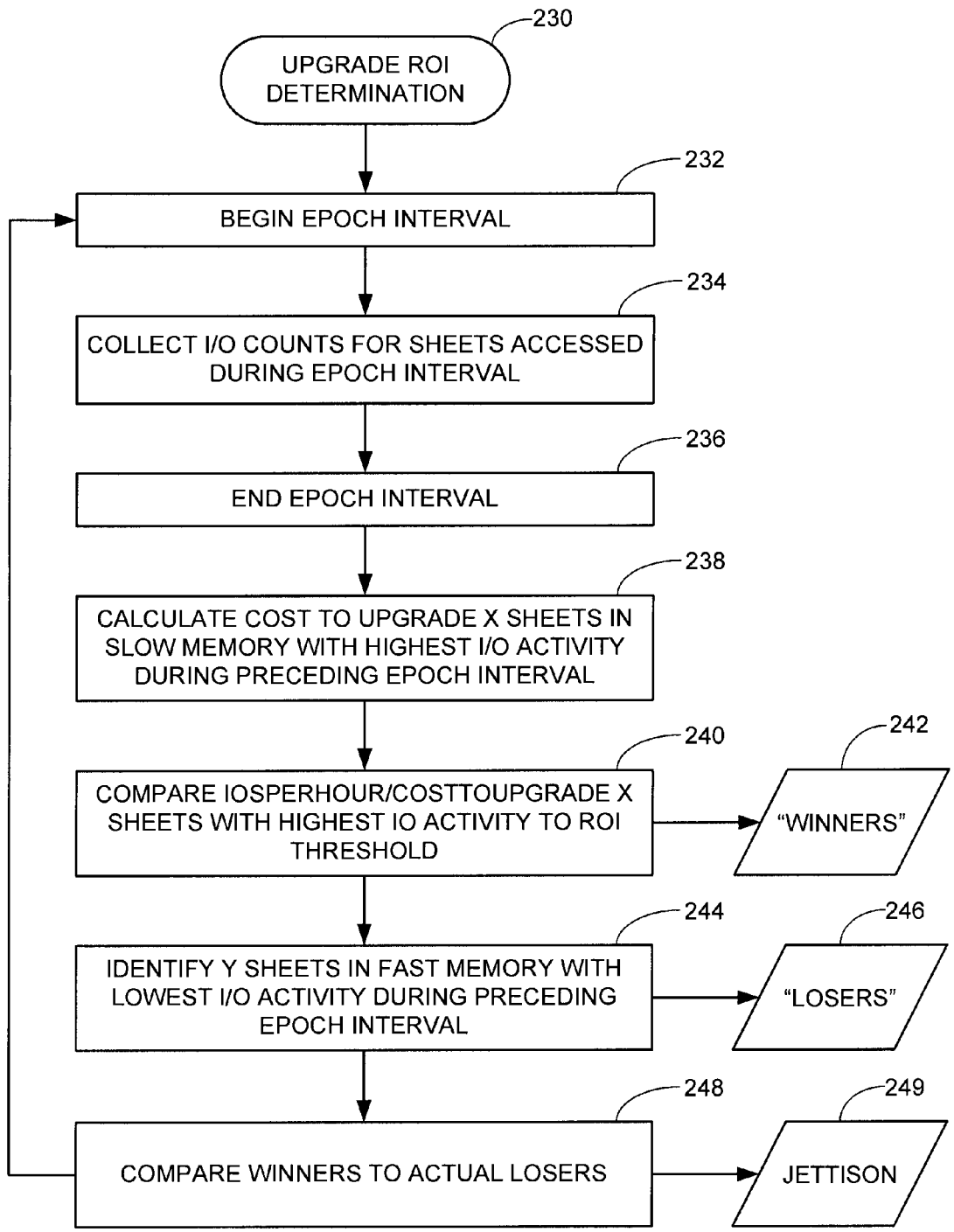
FIG. 9 is a flow chart for an UPGRADE ROI DETERMINATION routine generally illustrative of steps carried out in accordance with various embodiments of the present invention.

FIG. 9 shows a flow chart for an UPGRADE INITIAL ROI DETERMINATION routine 230, generally illustrative of steps carried out in accordance with the foregoing discussion. The routine 230 of FIG. 9 represents steps that are carried out by the HSU facility 200 during (or immediately after) each epoch interval.

At step 232, a new epoch is initiated with a selected duration such as 20 seconds. This can be carried out as signaled by the epoch timer 204 in FIG. 7. At step 234, the HSU utility 200 begins to accumulate user-initiated random access IO counts for sheets accessed during the associated epoch, responsive to inputs supplied by the cache manager 202 (FIG. 7). The counts are preferably weighted by the cache manager or by the HSU utility to account for various factors such as RAID configuration and data block size. This data collection continues until the end of the epoch at step 236.

The HSU facility next calculates the IOPSperHour(S) and CostToUpgrade(S) of the sheets in the HDD memory space that had the highest count values at step 238. These values are checked against the ROI threshold using equation (1) at step 240. Each sheet having a payback greater than the ROI threshold is declared a "winner" as indicated at 242. It is possible that no winners will emerge from a given epoch, and it is also possible that multiple winners may be declared. The HSU facility can select the single best winner, or may select up to X winners (e.g., X=4), with those winners being the sheets with the highest I/O counts that met the ROI threshold.

Once the winner or winners have been selected, the HSU facility 200 continues at step 244 to identify one or more "losers," as indicated at 246. The losers are the sheets of data stored in the SSD memory space 162 that have the lowest IO activity. The tables 206, 208 may be searched to find the sheets with the lowest I/O counts this epoch, or (if multiple sheets have zero I/Os this epoch) those that have gone the longest without IO activity in order to find the worst losers.

Finally, if any losers contain a previously upgraded sheet of data (i.e. is not unallocated), the IOPSperHour(F) and CostToUpgrade(F) of the losers and the IOPSperHour(S) and CostToUpgrade(S) of the winners are jointly compared to the ROI threshold using Equation (5), step 248. Any winners who do not exceed the ROI threshold against at least one loser based on Equation (5) are eliminated (jettisoned) from the list of winners, as shown at 249. The UPGRADE INITIAL ROI DETERMINATION routine then returns to step 232 to begin the data collection for the next epoch.

In some embodiments, the HSU facility proceeds at this point to direct the migration of data in accordance with the results of the routine of FIG. 9. For example, up to K winners 242 with the highest I/O counts may be upgraded from the HDD memory space 164 to the SSD memory space 162, and an appropriate number of losers 244 with the lowest I/O counts may be downgraded from the SSD memory space to the HDD memory space, where K is a user-settable parameter (e.g. K=2). The process continues in this fashion, selecting new winners and losers for each epoch in turn.

While this approach can advantageously improve the utilization of the SSD memory space, in some cases it is contemplated that making migration decisions based on a single epoch may result in less than optimal decisions. Depending on the host environment, user-initiated 10 can be bursty at times, and a one-time burst should not necessarily be extrapolated into a long term, unrealistic ROI level that drives an unnecessary migration.

Accordingly, further embodiments of the present invention configure the HSU facility 200 to observe the access patterns of the system over an extended period of time. This time should be long enough so that an accurate assessment of the patterns emerges, leading to confidence that migrating those sheets having access rates that consistently exceed the ROI hurdle will pay back the costs of the migration effort. The use of a longer single epoch may help in this decision making process, but the use of a single epoch is still vulnerable to the effects of a one-time burst, and may slow the system's adaptation to true I/O pattern changes.

Figure 10:
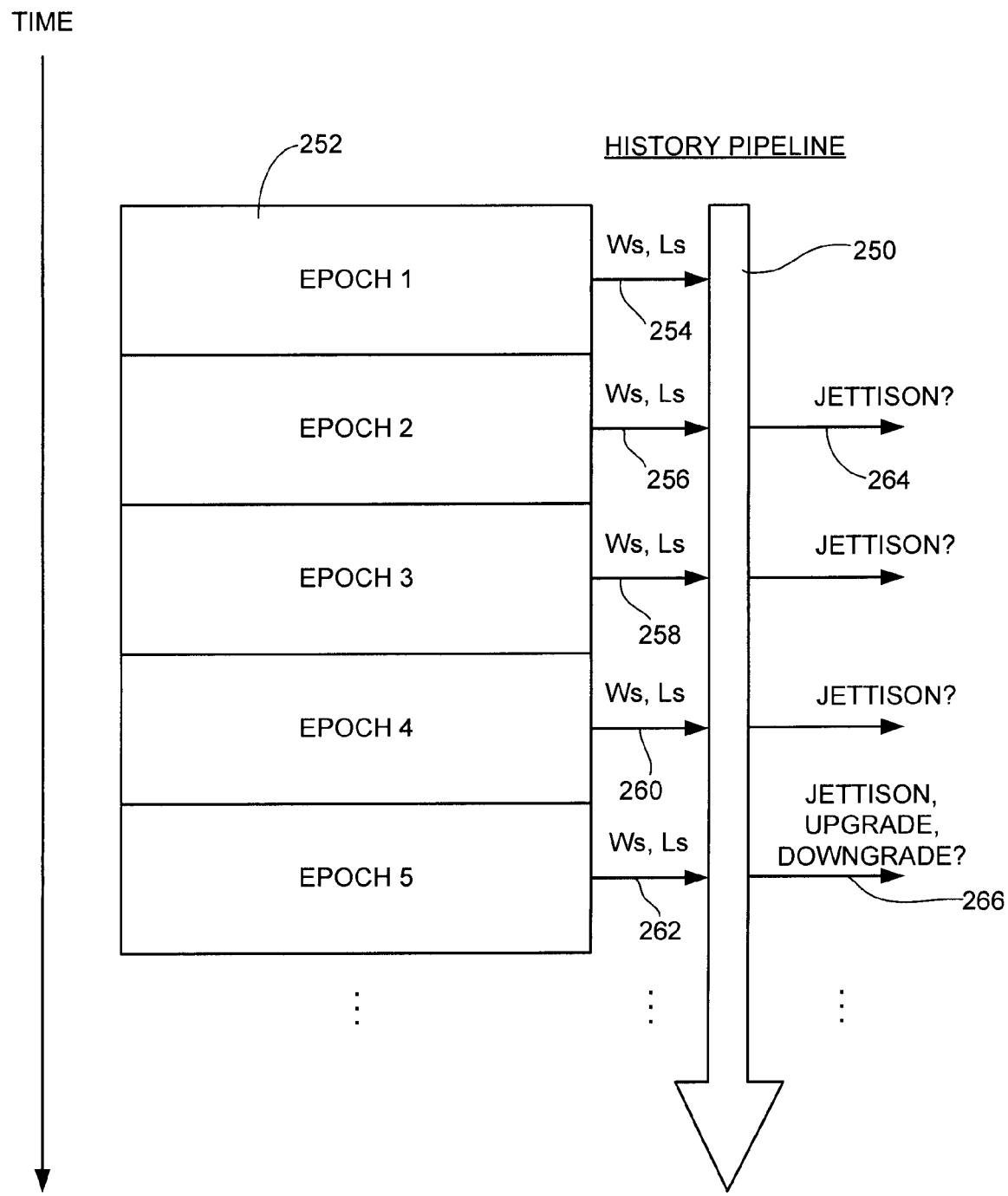
FIG. 10 is a time sequence illustrating the use of a history pipeline during the operation of the routine of FIG. 9.

FIG. 10 shows a history pipeline 250 that can be fed the winners and losers identified by FIG. 9. The history pipeline 250 allows the HSU facility to efficiently evaluate the continued 10 access rates of the various winners and losers over multiple epochs, allowing better ultimate migration decisions to be made.

FIG. 10 is a timing diagram to show operation of the HSU facility over an extended elapsed period of time. A number of successive epochs are denoted at 252. As before, each epoch 252 is contemplated as lasting 20 seconds, and each new epoch begins at the conclusion of the immediately preceding epoch.

Winners and losers (Ws and Ls) are declared for each epoch 252 in turn using the routine of FIG. 9, and these winners and losers are sequentially placed into the history pipeline 250. For example, arrowed path 254 represents the winners and losers identified during Epoch 1, arrowed path 256 represents the winners and losers identified during Epoch 2, and so on for the remaining epochs (e.g., 258 represents the winners and losers for Epoch 3, 260 for Epoch 4, and 262 for Epoch 5).

At the conclusion of each epoch, the HSU utility performs the ROI calculations in Equation (1) or Equation (5) on each of the winners and losers in the history pipeline to see if upgrading the winners (and downgrading the losers if necessary) would still provide a return on investment that exceeds the cost of migration of the data. For example, when the winners and losers 256 from Epoch 2 are placed into the pipeline 250, the HSU utility will re-evaluate the winners and losers 254 that were placed into the pipeline during Epoch 1 using the I/O count data generated in Epoch 2 for those sheets. If any winners 254 are no longer exhibiting favorable ROI values against the losers, those winners are jettisoned from the pipeline, as indicated at 264.

Once a winner has proved itself for a total number of Z+1 successive epochs (on initial determination epoch and Z re-examinations in the history pipeline), the winner is considered as a candidate for an upgrade migration operation. As in the example with no history pipeline, the system will select up to K winners to upgrade, and an appropriate number of losers to downgrade. The actual winners (and losers) to upgrade (and downgrade) can be picked in several ways; for example, based on the highest (lowest) I/O count in their initial determination Epoch, based on the highest (lowest) I/O count in the final Epoch in the history pipeline, or based on the highest (lowest) total I/O count across the Z+1 epochs in which they were tested.

The parameters X, Y, Z and K may be settable to any suitable values; in some embodiments, the number X of winners from each epoch can be set from 1 to 8, with a default value of 4. The number Y of losers can also be set from 1 to 8, with a default value of 4. The number Z of consecutive epochs that need to be survived can be from 2 to 7, with a default of 2, and the maximum number K of sheets selected to upgrade at the end of the process can be set from 1 to 4, with a default of 1. Z will usually be set greater than 1 because requiring sheets to prove their upgrade-worthiness for at least three consecutive epochs resists being fooled by one-time I/O bursts that straddle an epoch boundary.

FIG. 10 shows the use of a setting of Z=4, so that at the time of Epoch 5, the surviving winners and losers 254 initially determined in Epoch 1 can be selected for respective upgrade and downgrade operations or will be jettisoned, as indicated by arrowed path 260. Similarly, at the time of Epoch 6 the surviving winners and losers 254 initially determined in Epoch 2 can be selected for migrations, etc.

In a preferred approach, the history pipeline 250 is arranged such that winners and losers only persist in the pipeline for a limited amount of time; that is, they do not persist indefinitely once placed into the pipeline, but instead "time-out" at the end of Z+1 epochs. For example, by the time Epoch 5 ends in FIG. 10, the winners and losers 254 from Epoch 1 that are still in the pipeline are going to be removed from the pipeline in order to make room for the new winners and losers 262 from Epoch 5. Of course, it is possible that the winners and/or losers 262 selected during Epoch 5 may include some or all of the surviving winners and/or losers 254 that were previously selected by Epoch 1, so one or more of the winners and/or losers from Epoch 1 may be immediately reinserted back into the pipeline.

This automatic jettisoning keeps the pipeline from accumulating a large, uncontrolled number of entries which could bog down the system from both a data tracking and calculation overhead perspective. This approach also efficiently forms a "sliding window" filtering of the various candidates, in that a series of tests have to be passed to qualify for an upgrade over a relatively extended period of time (e.g., 5 epochs×20 seconds/epoch=100 seconds, etc.): first, an upgraded winner has to be among the very best ROI candidates during the initial epoch to have been placed into the pipeline; second, it has to maintain at least a good enough ROI during the next Z epochs to remain in the pipeline; and finally, it has to be among the K best ROIs of the surviving candidates at epoch Z+1 to be selected for the upgrade.

Because the history pipeline 250 produces a delaying action, any sheet that is upgraded or downgraded in any given epoch could also potentially be a candidate for a later upgrade/downgrade migration in an internal stage of the pipeline. Instead of searching the pipeline and removing such sheets, a flag can be set in the Sheet Activity array entry for those sheets to disable further migrations for Z epochs (by which time the sheet no longer appears in the history pipeline). Similarly, once a sheet has been upgraded or downgraded, a flag can be set in an appropriate data structure to make that sheet ineligible for further migrations for some set period of time. These mechanisms can further reduce the incidence of data thrashing.

The total amount of available space in the SSD memory space 162 will be limited so that eventually, each SSD upgrade (winner) will generally require a corresponding HDD downgrade (victim) to free up space in the target SSD space. A variety of factors may be taken into consideration when choosing an appropriate victim.

If there is no available unallocated space so that an occupied fast sheet will be selected as a loser in step 244, the HSU facility 200 can carry out a search of the upgrade sheets array 208 (FIG. 7), starting at the position following the last loser initially determined in the previous Epoch, and continuing for a user-selectable number A of entries in a round-robin fashion. This search selects the sheets from this range with the minimum count of IO operations during the preceding epoch as the potential losers. If more than one sheet has an IO count of zero, the sheet with the oldest epoch number (field 212) is considered to have the lower I/O count since this will be the sheet that has gone the longest time without IO activity. The parameter A will be set to a value greater than the parameter Y in the UPGRADE INITIAL ROI DETERMINATION process, and can be as large as the total number of fast sheets available to the HSU facility. Using small values of A (relative to the total number of fast sheets available) tends to make the system more conservative about downgrading previously upgraded sheets, especially recently upgraded ones.

FIG. 11 provides another, alternative timing diagram to illustrate the operation of the history pipeline 250 of FIG. 10 for three epochs 252 referenced as Epoch 100-102. It can be seen that the three operations of FIG. 9 (steps 240, 244 and 248) are sequentially carried out at the conclusion of each epoch. For example, at the end of Epoch 100, the winners and losers for that epoch will be inserted, the winners for the last Z=4 epochs are jettisoned that do not meet the ROI requirements of Equation (5), and then up to K surviving winners and losers from Epoch 96(100−4=96) are selected for upgrades and downgrades, respectively.

Figure 12:
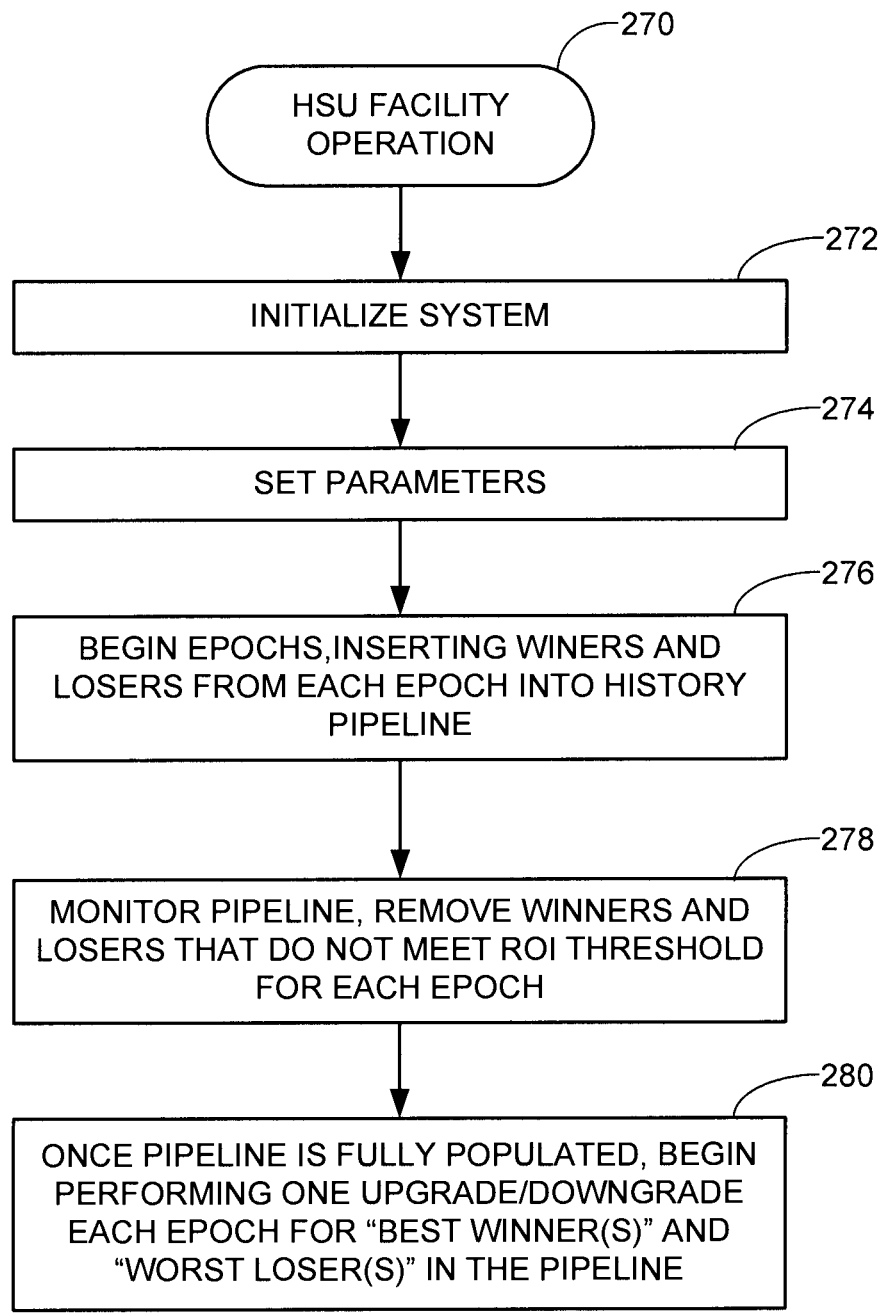
FIG. 12 is a flow chart for a HSU FACILITY OPERATION routine illustrative of steps carried out in accordance with various embodiments.

FIG. 12 presents a flow chart for an HSU FACILITY OPERATION routine 270, to summarize the foregoing discussion. The HSU facility is initialized at step 272, and various parameters are selected and/or loaded at step 274. This may include the creation of the HSU tables 206, 208 from existing system configuration information.

HSU facility operation commences at step 276, during which a succession of epoch intervals are defined, IO counts are accumulated during each epoch, and winners and losers (if any) for each epoch are loaded into the history pipeline 250.

Also in each epoch, the HSU facility re-tests the winners and losers 254 in each stage of the history pipeline and jettisons any previously inserted winners and/or losers that fail to continue to meet the requisite ROI thresholds as shown by step 278. After Z epochs have elapsed the pipeline will be fully populated, and at every subsequent epoch HSU facility 200 will perform migrations of the best winners and the worst losers that emerge from the pipeline (if any survive the numerous re-tests).

Once a migration decision is declared by the HSU facility 200, normal system processing takes over to carry out the migrations as quickly as feasible.

It will now be appreciated that the various embodiments discussed herein can present benefits over the prior art, such as the efficient selection of candidates for migration between slow and fast memory pools based on return on investment (ROI) evaluation of the costs associated with such migration. The use of accumulated IO counts over each epoch allows the data handling requirements of the system to be simplified, and enables the HSU facility to focus in on those distributed data sets that are most promising for upgrade and/or downgrade. The use of weighted IO counts advantageously allows the total cost of a migration to be taken into account in terms of actual system resources that need to be expended, and the filtering out of sequential counts ensures that random IO data are more likely to be placed into the fast pool.

The use of a history pipeline, while not necessarily required, further advantageously improves the likelihood that final migration decisions are made for data that will tend to have 10 host interest levels that are sustainably greater than the data being replaced. Moreover, the approaches set forth herein allow the actual costs, and improvements in performance, to be quantified.

It will be appreciated that traditional data migration capabilities were often designed to operate in environments where one goal was to reduce the cost of the overall storage system by utilizing cheaper media (slower HDDs, tapes, etc.) to hold data that was accessed relatively infrequently. To determine if data was accessed infrequently, these data migration capabilities might gather access statistics for hours or days, and then plan a set of data migrations that would take place over subsequent hours or days.

The various embodiments presented herein employ sophisticated I/O filtering techniques and decision criteria, enabling a data migration capability that detects and reacts to changes in the overall I/O workload presented to the storage system in real time and quickly enough to begin improving the performance of a newly executed application within seconds or minutes of its inception, without the risk of degrading overall storage performance via unnecessary or counter-productive data migrations ("trashing").

While the various embodiments discussed herein have been directed to a distributed data storage system that uses a data storage array of SSDs and HDDs to form fast and slow memory pools, it will be appreciated that this is merely for purposes of presenting an exemplary embodiment. The various embodiments can readily be adapted for use in other types of memory spaces having a relatively faster IO memory response in some locations and a relatively lower IO memory response in other locations.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising a storage array of independent data storage devices arranged to form a fast pool and a slow pool of said devices, and a controller which migrates a first set of data sets stored across a plurality of said devices in the slow pool to a plurality of said devices in the fast pool and a second set of data sets stored across a plurality of devices in the fast pool to a plurality of devices in the slow pool responsive to a return on investment (ROI) determination by the controller that an estimated cost of said migration will be outweighed by an overall improved data transfer capacity of the storage array over a predetermined minimum payback period of time.

2. The apparatus of claim 1, in which the controller makes the ROI determination in relation to an accumulated count of user-initiated accesses of a data set over a predetermined epoch interval and the estimated cost to migrate said data set from the slow pool to the fast pool.

3. The apparatus of claim 1, in which the devices in the slow pool are characterized as hard disc drives (HDDs) that use magnetic discs as main storage memory, and the devices in the fast pool are characterized as solid state drives (SSDs) that use solid-state semiconductor memory cells as main storage memory.

4. The apparatus of claim 1, in which the controller further forms a history pipeline of migration candidates, in which the candidates from the slow pool exhibit an ROI relative to the candidates from the fast pool that exceed a predetermined ROI threshold over each of a succession of consecutive epoch intervals, wherein the data sets to migrate are selected from among said migration candidates.

5. An apparatus comprising:
a data storage array of data storage devices arranged to respectively form a fast pool and a slow pool of said devices; and
a controller which migrates a first set of selected data sets from the slow pool to the fast pool and a second set of selected data sets from the fast pool to the slow pool responsive to a return on investment (ROI) determination by the controller made in relation to an accumulated count of user-initiated accesses of the data set over a predetermined epoch interval and an estimated cost to migrate said data sets between the pools.

6. The apparatus of claim 5, in which the ROI determination is further made in relation to a predetermined future payback period over which estimated improvements in overall data transfer rates for the array as a result of said migration outweigh the estimated cost to carry out said migrations at the beginning of said payback period.

7. The apparatus of claim 5, in which the controller establishes a succession of epoch intervals each having a common predetermined duration and a unique identifier value, accumulates respective IO access counts for various data sets stored in the fast and slow pools for each epoch interval by said identifier value, and places selected ones of said various data sets having ROI determination values that exceed a predetermined threshold into a history pipeline.

8. The apparatus of claim 7, in which the selected data sets to be migrated between the slow pool and the fast pool emerge from the history pipeline after having said ROI determination values that exceed the predetermined threshold for each of a predetermined plurality of epochs.

9. The apparatus of claim 7, in which a second selected data set placed into the history pipeline by the controller is subsequently jettisoned from the pipeline by the controller during a subsequent epoch interval responsive to said second data set having an ROI determination value less than the predetermined ROI threshold over said subsequent epoch interval.

10. The apparatus of claim 5, in which the ROI determination is further made by the controller in relation to an additional estimated cost to concurrently displace a second data set from the fast pool to the slow pool to accommodate the selected data set.

11. The apparatus of claim 5, in which the controller determines an associated ROI value for the selected data set for each of a predetermined number of consecutive epoch intervals in relation to an accumulated count of IO access received during each said epoch interval, and directs the migration of the selected data set to the fast pool responsive to each of the associated ROI values exceeding an ROI threshold.

12. The apparatus of claim 5, in which the data set comprises a RAID (redundant array of independent discs) data set formed from a plurality of data stripes, each data stripe stored to a different one of the independent data storage devices.

13. The apparatus of claim 5, in which the fast pool of the data storage array is formed from a first plurality of solid-state drives (SSDs) each comprising a non-volatile solid-state array of memory cells, the slow pool of the data storage array is formed from a second plurality of hard disc drives (HDDs) each comprising at least one rotatable data storage medium, and the estimated cost to carry out said migration includes an estimated time required to access the selected data set from the HDDs and transfer said data set to a controller cache memory in preparation for subsequent transfer to said SSDs.

14. A method comprising:
arranging a data storage array of data storage devices to respectively form a fast pool and a slow pool of said devices;
storing a first set of data sets initially across a plurality of said devices in the slow pool;
storing a second set of data sets initially across a plurality of said devices in the fast pool;
determining return on investment (ROI) values in relation to an accumulated count of user-initiated accesses of the first set of data sets over a predetermined epoch interval and an estimated cost to migrate the respective first and second sets of data sets between the slow and fast pools; and
migrating selected members of the first set of data sets to the fast pool and selected members of the second set of data sets to the slow pool responsive to said ROI values.

15. The method of claim 14, further comprising determining the ROI values in relation to a predetermined future payback period over which estimated improvements in overall data transfer rates with the array as a result of said migration outweigh the estimated cost to carry out said migration at the beginning of said payback period.

16. The method of claim 14, further comprising:
establishing a succession of epoch intervals each having a common predetermined duration;
accumulating respective IO access counts for various data sets stored in the slow pool and in the fast pool for each epoch interval; and
placing selected ones of said various data sets having ROI determination values that exceed a predetermined threshold relative to a data set from the other pool into a history pipeline.

17. The method of claim 16, further comprising a step of selecting the selected data set for said migration after the selected data set emerges from the history pipeline after having ROI determination values that exceed the predetermined threshold for each of a predetermined plurality of epochs.

18. The method of claim 16, further comprising a step of jettisoning a second selected distributed data set from the pipeline during a subsequent epoch interval responsive to said second data set having an ROI determination value less than the predetermined ROI threshold over said subsequent epoch interval.

19. The method of claim 14, in which the ROI determination is further made in relation to an additional estimated cost to concurrently displace a second distributed data set from the fast pool to the slow pool to accommodate the selected data set.

20. The method of claim 14, in which the fast pool of the data storage array is formed from a first plurality of solid-state drives (SSDs) each comprising a non-volatile solid-state array of memory cells, the slow pool of the data storage array is formed from a second plurality of hard disc drives (HDDs) each comprising at least one rotatable data storage medium, and the estimated cost to carry out said migration includes an estimated time required to access the selected data set from the HDDs and transfer said data set to a controller cache memory in preparation for subsequent transfer to said SSDs.

* * * * *